Aug. 23, 1927.

B. D. GORDON ET AL 1,639,886

AUTOMOBILE RIM

Filed Nov. 11, 1922

INVENTORS
B. D. Gordon
W. H. E. Pearen
By
ATTYS

Patented Aug. 23, 1927.

1,639,886

UNITED STATES PATENT OFFICE.

BERTLAND DELILE GORDON AND WILLIAM HENRY ESTON PEAREN, OF MEDORA, MANITOBA, CANADA.

AUTOMOBILE RIM.

Application filed November 11, 1922. Serial No. 600,436.

The invention relates to improvements in automobile rims and an object of the invention is to provide a rim having a portion thereof detachable to permit of the quick mounting or dismounting of the usual automobile tire and without requiring to use special tools for the work.

A further object of the invention is to construct a two part rim, one part of which is permanently fastened to the wheel and the other part of which is releasably connected to the stationary portion, the removable part being constructed and arranged so that it can be easily and quickly dismounted or attached as occasion demands.

With the above more important objects in view the invention consists essentially in the arrangement and construction of parts hereinafter more particularly described and later pointed out in the appended claim, reference being had to the accompanying drawing in which:

In the drawing like characters of reference indicate corresponding parts in the several figures.

Figure 1:
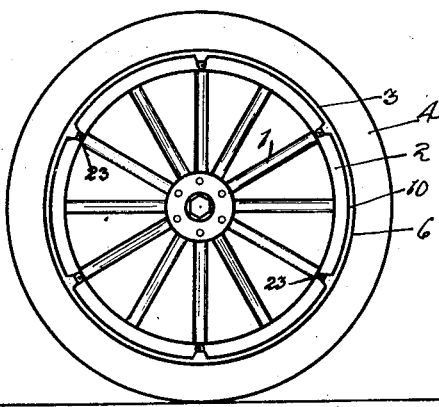
Fig. 1 is a side view of an automobile wheel equipped with our invention.

The customary automobile wheel 1 presents the usual wooden rim or felly 2 and on the wheel rim we mount our metal rim 3 which holds the automobile tire 4 in place. The metal rim 3 comprises a main member 5 and a detachable member 6. The main member 5 surrounds the wheel rim 2 and is permanently attached thereto in a suitable manner as by screws, as indicated at 7.

The main member is provided at one edge with an outwardly turned more or less U-shaped continuous flange 8 and at the other edge with an outstanding slightly offset continuous flange 9, the latter flange projecting beyond the outer side of the wheel rim 2.

Figure 2:
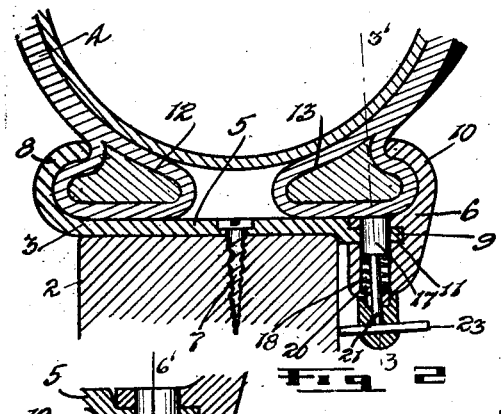
Fig. 2 is an enlarged detailed vertical sectional view transversely through the improved rim and parts associated therewith.
Figure 3:
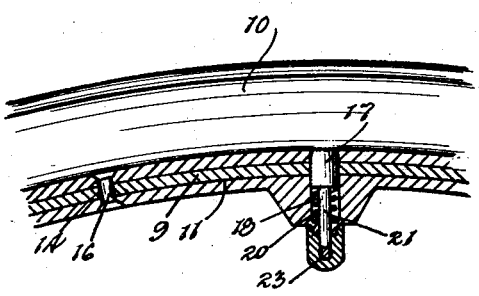
Fig. 3 is a sectional view at 3—3′ Fig. 2 with the tire removed.
Figure 5:
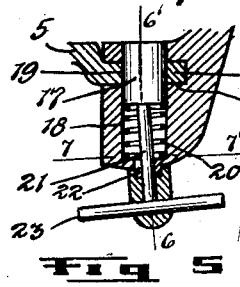
Fig. 5 is an enlarged detailed sectional view through a portion of the rim showing the locking pin and parts associated therewith.
Figure 4:
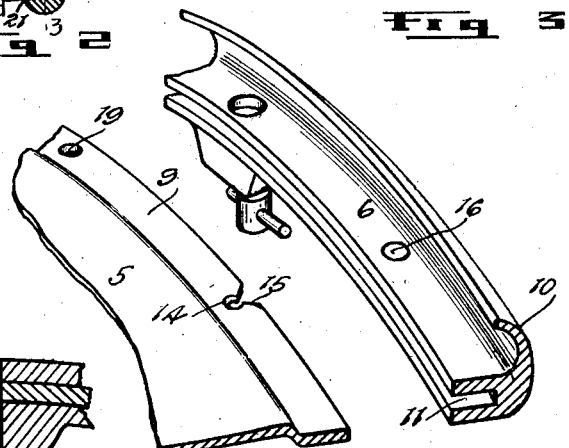
Fig. 4 is a perspective view of a portion of the rim with the parts thereof detached.
Figure 6:
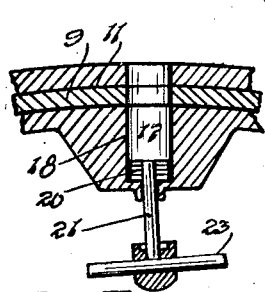
Fig. 6 is a sectional view at 6—6′ Fig. 5 and with the locking pin pulled inwardly and locked in released position.
Figure 7:
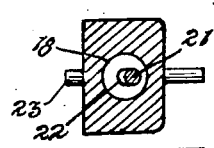
Fig. 7 is a horizontal sectional view at 7—7′ Fig. 5.

The detachable member 6 is more or less in the nature of a ring fitted with an upstanding substantially U-shaped flange 10 and provided on the inner side with a comparatively deep continuous groove or channel 11, which latter is adapted to receive the flange 9 snugly. By reference to Fig. 2 it will be apparent that when the members 5 and 6 are brought together they form a rim having a flat base to receive the tire and hooked shaped side flanges adapted to engage and hold the inner portions 12 and 13 of the tire which are of ordinary form.

The flange 9 is supplied with an opening 14 entered through a tapering side slot 15 and the member 6 is provided with a rivet 16 passing across the groove 11 and adapted, when the members 5 and 6 are brought together, to enter the opening 14 through the slot 15.

The detachable member 6 is provided at suitable intervals with releasable locking means for fastening the same to the flange 9. In the present instance the several locking means are similarly constructed, each comprising a sliding plunger or pin 17 operating within a pocket 18 formed in the member 6, the pin in the locked position passing through an opening 19 provided in the flange 9 and being held normally locked by the action of a coil spring 20 located within the pocket behind the pin.

A stem 21 extends from the pin or plunger and passes out through the end of the pocket which is provided with a slot 22 to receive the stem. The outer end of the stem is provided with a finger piece 23 in the form of a cross rod. In the present instance the stem is inclined or laterally deflected and the slot 22 is shaped to accommodate the stem when the same moves outwardly or inwardly. By so deflecting the stem we can lock the plunger when it is pulled inwardly within the pocket by giving the stem a quarter turn which causes it to bind in the slot 22.

When one wishes to remove his tire he simply grasps the finger pieces, pulls them inwardly towards the centre of the wheel and gives each finger piece a quarter turn, which action locks the pins against outward movement. When the pins are withdrawn they are free of the opening 19 with a result that one can remove the member 6. This being done the tire can be freely withdrawn from the member 5.

When one wishes to remount the tire he puts it in place on the stationary member 5 and then aligns the member 6 by initially entering the rivet or pin 16 in the opening 14. Once this is done the rest of the member 6 can be shoved into place and the pins released by giving them a quarter turn to relock the member 6 in place.

Whilst we have entered into a detailed description of the locking pins and parts associated therewith, it will be readily understood that we do not wish to be limited to the precise construction shown, as such can be readily modified without departing from the spirit of the invention as set forth in the accompanying claim.

What we claim as our invention is:

A device of the character described comprising a member having a pocket formed therein, a plunger slidable in said pocket, a spring confined between one end of the plunger and abutment means formed at one end of the pocket, an inclined stem carried by the plunger and projecting outwardly from the pocket through a slot formed in said member and a finger grip secured to the projecting terminal of the stem.

Signed at Medora this 15th day of August, 1922.

BERTLAND DELILE GORDON.
WILLIAM HENRY ESTON PEAREN.